US012646790B2

(12) United States Patent
Bashevkin et al.

(10) Patent No.: US 12,646,790 B2
(45) Date of Patent: Jun. 2, 2026

(54) PASSIVE VENT SYSTEM

(71) Applicant: Fluence Energy, LLC, Arlington, VA (US)

(72) Inventors: Eli Bashevkin, Arlington, VA (US); Dhanna Nath Siddh, Arlington, VA (US); Vishakh Brahmanand Dwivedi, Arlington, VA (US); Prachi Deshpande, Arlington, VA (US); Trevor Hargrave, Trevor Hargrave, VA (US); Avijit Saha, Arlington, VA (US); Christopher Thanaraj, Arlington, VA (US); Prasanna Chinnathambi, Arlington, VA (US)

(73) Assignee: FLUENCE ENERGY, LLC, Arlington, VA (US)

( * ) Notice: Subject to any disclaimer, the term of this patent is extended or adjusted under 35 U.S.C. 154(b) by 714 days.

(21) Appl. No.: 18/082,209

(22) Filed: Dec. 15, 2022

(65) Prior Publication Data

US 2024/0204335 A1 Jun. 20, 2024

(51) Int. Cl.
H01M 50/317 (2021.01)
H01M 10/42 (2006.01)
(Continued)

(52) U.S. Cl.
CPC ....... H01M 50/317 (2021.01); H01M 10/425 (2013.01); H01M 10/482 (2013.01); (Continued)

(58) Field of Classification Search
CPC ............. H01M 50/317; H01M 50/375; H01M 10/425; H01M 10/482; H01M 10/486
See application file for complete search history.

(56) References Cited

U.S. PATENT DOCUMENTS

2003/0150230 A1 8/2003 Waddle et al.
2005/0276023 A1 12/2005 Zansky et al.
(Continued)

FOREIGN PATENT DOCUMENTS

CN 110994060 A 4/2020
WO 2018222858 A1 12/2018
(Continued)

OTHER PUBLICATIONS

Notice of Allowance for U.S. Appl. No. 17/810,983, dated Jun. 22, 2023, 9 pages.
(Continued)

*Primary Examiner* — Karie O'Neill Apicella
(74) *Attorney, Agent, or Firm* — .Buchanan Ingersoll & Rooney PC

(57) ABSTRACT

A battery thermal event management system includes an enclosure to store a plurality of battery modules, one or more ventilation panels, at least one actuator to open the one or more ventilation panels, and at least one sensor to detect one or more parameters. Further, the battery thermal event management system includes a detection system with a processor memory, and programming in the memory, coupled to the enclosure. The programming causes the battery thermal event management system to detect, via the at least one sensor, the one or more parameters. Next, the battery thermal event management system determines whether the detected one or more parameters indicate a ventilating event. Further, based on the detected one or more parameters indicating the ventilating event, the battery thermal event management system opens, via the at least one actuator, the one or more ventilation panels.

24 Claims, 7 Drawing Sheets

(51) Int. Cl.
  H01M 10/48      (2006.01)
  H01M 50/375     (2021.01)
(52) U.S. Cl.
  CPC ....... H01M 10/486 (2013.01); H01M 50/375
    (2021.01); H01M 2010/4271 (2013.01); H01M
                                    2200/20 (2013.01)

(56)                    References Cited

U.S. PATENT DOCUMENTS

| | | |
|---|---|---|
| 2007/0002536 A1 | 1/2007 | Hall et al. |
| 2008/0179053 A1 | 7/2008 | Kates |
| 2010/0059270 A1 | 3/2010 | Yeh et al. |
| 2012/0086399 A1 | 4/2012 | Choi |
| 2012/0121056 A1 | 5/2012 | Sato et al. |
| 2014/0210419 A1 | 7/2014 | Kim |
| 2015/0003009 A1 | 1/2015 | Moore et al. |
| 2015/0167350 A1 | 6/2015 | Bryla et al. |
| 2015/0194707 A1 | 7/2015 | Park |
| 2015/0372517 A1 | 12/2015 | Lee |
| 2017/0294633 A1 | 10/2017 | Zimbru, Jr. et al. |
| 2018/0142935 A1 | 5/2018 | Jacobi |
| 2018/0301279 A1 | 10/2018 | Klaponski et al. |
| 2020/0144845 A1 | 5/2020 | Facchini et al. |
| 2021/0281081 A1 | 9/2021 | Singer et al. |
| 2022/0013835 A1 | 1/2022 | Bradwell et al. |
| 2022/0094014 A1 | 3/2022 | Marr et al. |

FOREIGN PATENT DOCUMENTS

| | | | | |
|---|---|---|---|---|
| WO | 2021006011 A1 | 1/2021 | | |
| WO | WO-2021111409 A2 * | 6/2021 | .......... | G08B 17/117 |

OTHER PUBLICATIONS

Vigilex Energy, Dual-Vent, Fire and Explosion Protection for Bess, Jun. 28, 2023, 3 pages, retrieved from the Internet: https://vigilexenergy.com/portfolio-item/dual-vent.

Vigilex Energy, Fire and Explosion Protection for Bess, Feb. 2, 2023, 10 pages, retrieved from the Internet: https://vigilexenergy.com.

International Search Report and Written Opinion for International Application No. PCT/US21/30551, mailed Aug. 13, 2021, 14 pages.

International Search Report and Written Opinion for International Application No. PCT/US22/44366, mailed Jan. 6, 2023, 13 pages.

Entire patent prosecution history of U.S. Appl. No. 17/810,983, filed Jul. 6, 2022, entitled, "Cell and Rack Performance Monitoring System and Method."

Entire patent prosecution history of U.S. Appl. No. 17/915,906, filed Sep. 29, 2022, entitled, Energy Storage System With Removable, Adjustable, and Lightweight Plenums.

International Search Report and Written Opinion for International Application No. PCT/US2023/026407, mailed Oct. 13, 2023, 18 pages.

* cited by examiner

Battery Thermal
Event Management System
100

Battery Node
110A

Battery Thermal
Event Management
System 100

Battery
Node
110A

Battery
Elements
(e.g. Battery
Racks)
120A-F

120A
Battery Element
(e.g. Battery
Rack)

122A-N
Battery Modules

122A
Battery Module

Battery Thermal
Event Management System
300

Battery Node
110B

Actuator
103A

Ventilation Panel
102A

Ventilation Panel
102B

Actuator
103B

Sensor
104

Enclosure
301

Detection System
105

Ventilation Panels
(e.g. Passive
Vents)
102D-I

*FIG. 5*

Thermal Runaway
Event Detection
Protocol 500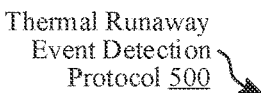

Detect, via at least one sensor, one or more parameters that are indicia of a thermal runaway event
505

Determine whether the detected one or more parameters indicate the thermal runaway event
510

Open, via at least one actuator, a plurality of ventilation panels to allow one or more gases or smoke to escape from inside an enclosure to store a plurality of battery modules
515

PASSIVE VENT SYSTEM

TECHNICAL FIELD

The present subject matter relates to examples of efficient detection of thermal runaway events in a battery thermal event management system made up of multiple battery modules.

BACKGROUND

A battery thermal event management system typically includes a multitude of individual battery modules to provide power: in particular, these battery modules work in concert to provide a power inverter with direct current (DC) power, which the inverter then provides out as alternating current (AC) to end usage electrical devices.

Traditional electrochemical battery modules possess a high energy density factor, storing immense amounts of potential energy in a relatively small space. Potential energy in an electrochemical battery has a propensity to express itself in exothermic reactions, and therefore must be controlled and contained. When controlled, the potential energy is converted into electrical energy, providing electrical power to a target device, vehicle, or system. However, when the potential energy of an electrochemical battery is expressed in an uncontrolled manner, the expulsion of kinetic energy and combustible material can occur.

In particular, lithium ion batteries, which utilize lithium cathodes and lithium salts under pressure, can behave in an uncontrolled manner and release combustible material. If partitions within the lithium ion battery are punctured, the rapid transfer of electrical charge from the cathode of the battery to the anode of the battery can cause the battery to swell and self-heat. An electrical short within a lithium ion battery could become overheated, experiencing thermal runaway, and potentially release combustible gases. Thermal runaway is a phenomenon in which a lithium-ion cell enters an uncontrollable, self-heating state. Other types of batteries, such as flow batteries also experience uncontrolled behavior, producing combustible gases, in similar situations.

While sturdier construction can prevent and correct for issues regarding puncture of electrochemical batteries, or exposure of electrochemicals to humid air, and improved wiring with appropriate safety redundancies can reduce the probabilities of electrical shorts, thermal runaway remains a problem. Electrochemical batteries, in the act of charging or discharging, naturally generate heat—the simplest way to reduce the risk of thermal runaway in an electrochemical battery is to build a less efficient electrochemical battery. However, there remains a compelling interest in maximally-efficient electrochemical batteries, in order for electrochemical batteries to effectively compete with traditional, relatively energy-dense, relatively small-footprint energy sources, such as coal or oil power plants. Preventing thermal runaway events, or detecting and suppressing thermal runaway events, in electrochemical battery thermal event management systems remains a paramount safety and performance goal.

SUMMARY

Hence, there is room for further improvement in methods for detecting and mitigating thermal runaway events in a battery thermal event management system, and in energy storage systems that incorporate such methods. The thermal runaway event detection technologies disclosed herein are able to detect, via a sensor, parameters that are indicia of a thermal runaway event, to determine whether a thermal runaway event is indicated, and further to open, via an actuator, a ventilation panel to allow gases or smoke to escape from within an enclosure of the battery thermal event management system. Ventilating gases or smoke during a thermal runaway event allows gas to escape to the atmosphere rather than accumulating with the enclosure, thereby limiting the combustible volume and pressure of gas.

In a first example, a battery thermal event management system includes an enclosure to store a plurality of battery modules and one or more ventilation panels. The battery thermal event management system also includes at least one actuator to open the one or more ventilation panels, and at least one sensor to detect one or more parameters. Further, the battery thermal event management system includes a detection system coupled to the enclosure. The detection system includes a processor coupled to the at least one actuator and the at least one sensor and a memory. The memory is accessible to the processor and programmed to configure the battery thermal event management system. First, the battery thermal event management system detects, via the at least one sensor, the one or more parameters. Second, the battery thermal event management system determines whether the detected one or more parameters indicate a ventilating event. Third, based on the detected one or more parameters indicating the ventilating event, the battery thermal event management system opens, via the at least one actuator, the one or more ventilation panels.

In a second example, a method includes first detecting, via at least one sensor, one or more parameters that are indicia of a thermal runaway event. Second, the method includes determining whether the detected one or more parameters indicate the thermal runaway event. Third, the method includes based on the detected one or more parameters indicating the thermal runaway event, opening, via at least one actuator, a plurality of ventilation panels to allow one or more gases or smoke to escape from inside an enclosure to store a plurality of battery modules and thereby operate the ventilation panels in the active element mode.

In a third example, a non-transitory machine-readable medium includes thermal runaway event detection programming, which when executed configures a battery thermal event management system to implement the following functions. First, the non-transitory machine-readable medium includes to detect, via an at least one sensor, one or more parameters that are indicia of a thermal runaway event. Second, the non-transitory machine-readable medium includes to determine whether the detected one or more parameters indicate the thermal runaway event. Third, based on the detected one or more parameters indicating the thermal runaway event, the non-transitory machine-readable medium includes to open, via at least one actuator, a plurality of ventilation panels to allow one or more gases or smoke to escape from inside an enclosure to store a plurality of battery modules and thereby operate the ventilation panels in the active element mode.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 5 is a flowchart depicting a thermal runaway event detection protocol.

PARTS LISTING

Figure 1A:
FIG. 1A is an isometric translucent view of a battery thermal event management system implemented in a battery node with two ventilation panels on the top of the battery node enclosure.
Figure 1A:
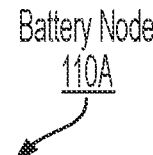
Figure 1A:
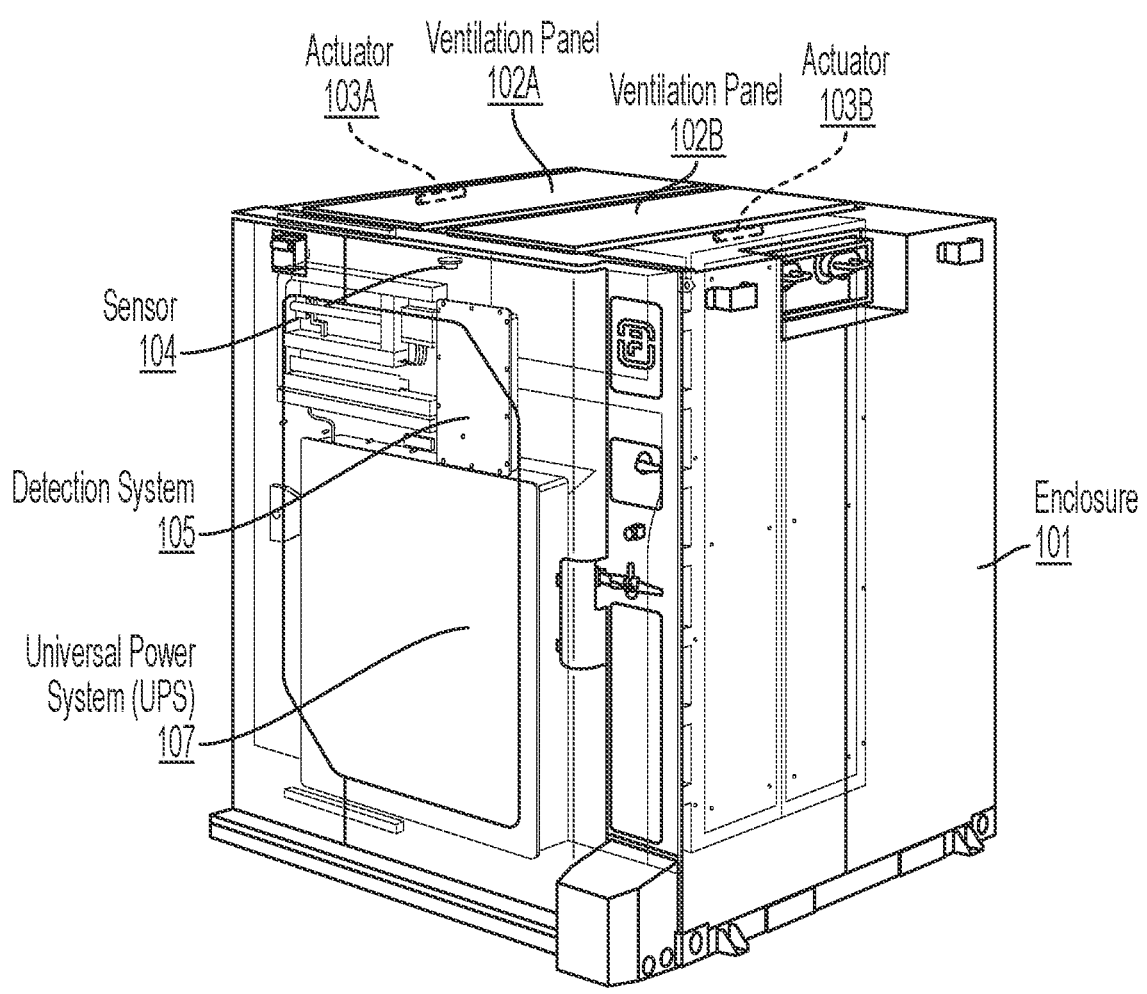

100 Battery Thermal Event Management System
101 Enclosure
102A-I Ventilation Panel
103A-B Actuator
104 Sensor
105 Detection System
107 Universal Power System (UPS)
110A-N Battery Node
120A-F Battery Element (e.g., Battery Rack)
122A-N Battery Cells
230 Processor
232 Network Interface
235 Memory
237 Thermal Runaway Event Detection Programming
239A-N Parameters
241 Passive Deflagration Panel Mode Setting
245 Amount of Gases or Smoke Value
247 Thermal Runaway Event Threshold
291 Active Element Mode
293 Passive Deflagration Panel Mode
295 Amount of Gases or Smoke
300 Battery Thermal Event Management System
301 Enclosure
400 Energy Storage System
402 Energy Source
404 Power Inverter
406 Connected Load
500 Thermal Runaway Event Detection Protocol

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical, physical, electrical, or optical connection, link or the like by which signals or light produced or supplied by one system element are imparted to another coupled element. Unless described otherwise, coupled elements or devices are not necessarily directly connected to one another and may be separated by intermediate components, elements, or communication media that may modify, manipulate or carry the light or signals.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as $\pm10\%$ from the stated amount. The terms "approximately" and "substantially" mean that the parameter value or the like varies up to $\pm10\%$ from the stated amount.

The orientations of the battery nodes, racks, elements, modules, or cells; associated components; and/or any complete devices, such as energy storage systems, incorporating battery nodes, racks, elements, modules, or cells such as shown in any of the drawings, are given by way of example only, for illustration and discussion purposes. In operation for a particular battery thermal event management application, a battery node, rack, element, module, or cell may be oriented in any other direction suitable to the particular application of the battery thermal event management system, for example upright, sideways, or any other orientation. Also, to the extent used herein, any directional term, such as left, right, front, rear, back, end, up, down, upper, lower, top, bottom, and side, are used by way of example only, and are not limiting as to direction or orientation of any energy storage system or battery nodes, racks, elements, modules or cells; or component of an energy storage system or battery node, rack, element, module, or cell examples illustrated in the accompanying drawings and discussed below.

The phrase "ventilating event" as used herein includes any event where ventilation of a volume by a battery thermal event management system 100, 300 is needed. "Ventilating events" may include thermal runaway events; high concentration of gases, smoke, or airborne particulates events; as well as contaminant events, maintenance events, testing events, security events, transportation events, or any event the operator of the battery thermal event management system 100, 300 considers sufficient to require or justify ventilation of the volume managed by the battery thermal event management system 100, 300. Some ventilating events may be triggered in response to environmental stimuli experienced by sensors, and some ventilating events may be triggered by an operator making a decision based upon data.

Figure 4:
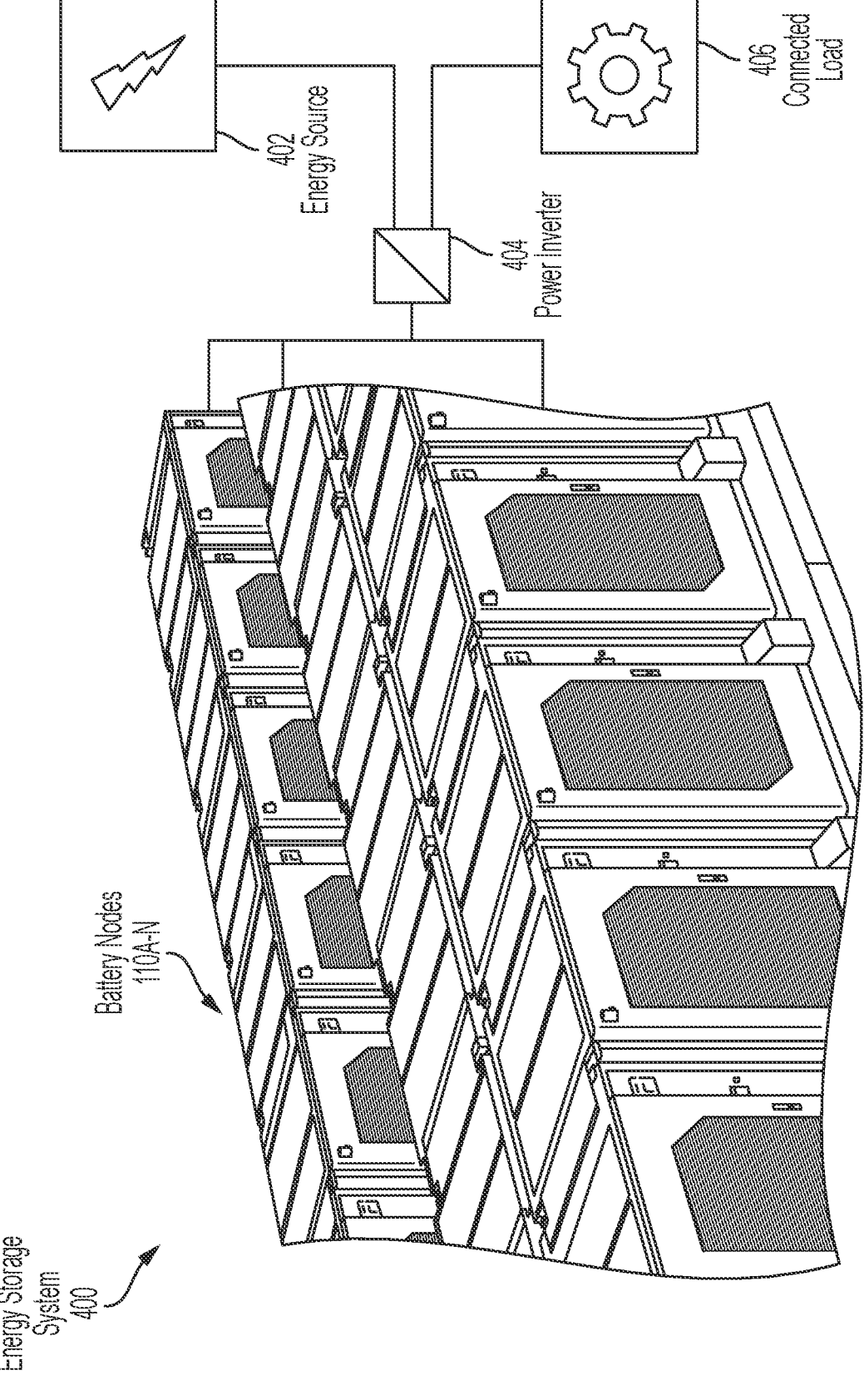
FIG. 4 is an isometric view of an energy storage system that includes multiple battery nodes.

FIG. 1A is an isometric translucent view of a battery thermal event management system 100 implemented in a battery node 110A with two ventilation panels 102A-B on the top of the battery node 110A enclosure 101. The battery node 110A is a battery structure that generally contains all of the components to facilitate charging by direct current electricity, storing direct current electricity in an electrochemical format, and producing, via discharge, direct current electricity. The battery node 110A may also include safety features, as well as features which simplify the movement and logistics of transporting and operating the battery node 110A. The battery node 110A may require other components in order to convert discharged direct current into alternating current, or to track or direct charging and discharging, as shown in FIG. 4. Multiple battery nodes 110A-N may be linked together in order to maximize efficient electrochemical storage of electricity.

The contents of the battery node 110A are within the enclosure of the battery node 110A. The enclosure 101 can be made of metal in order to protect the battery node 110A from puncture and percussive damage, but the enclosure 101 may include in portions on in its entirety: electrical conductors, to facilitate the transfer of electricity or to direct errant electricity away from the battery modules 122A-N of the enclosure 101; electrical insulators, to prevent the transfer of electricity into or out of the enclosure 101; thermal conductors, to facilitate the transfer of heat out of or away from the enclosure 101 to avoid a thermal runaway event; thermal insulators, to prevent the transfer of heat into the enclosure 101; or hybrid, configurable materials capable of selectively expressing, absorbing, or blocking electricity or heat. The enclosure 101 is depicted as a rectangular cuboid, however any shape with any number of faces is contemplated.

The enclosure 101 includes two ventilation panels 102A-B on the top of the enclosure 101. The ventilation panels 102A-B can be any number of ventilation panels 102A-B. and may be placed on any face of the enclosure 101. The ventilation panels 102A-B are configured to be in one of at least two states: an active element mode 291 (see FIG. 2), and a passive deflagration panel mode 293 (see FIG. 2). The battery thermal event management system 100 is designed to maintain a sufficiently low volume of gas (or smoke) in the battery node 110A enclosure 101 resulting from a thermal runaway event to prevent the battery node 110A from becoming over-pressurized. When in the passive deflagration panel mode 293, the ventilation panels 102A-B are closed, and act as deflagration panels, meaning pressure alone will open the ventilation panels 102A-B. When in the active element mode 291, the ventilation panels 102A-B are open, and allow gas or smoke from the battery modules 122A-N to escape to the atmosphere rather than accumulating within the battery node 110A, thereby limiting the combustible volume of gas and the incendiary effect of smoke.

The battery node 110A includes at least one sensor 104. The sensor 104 is designed to detect certain parameters 239A-N (see FIG. 2) or phenomena which are indicia of a thermal runaway event. The parameters 239A-N or phenomena can include gases and gaseous pressure which can facilitate combustion, or smoke; the parameters 239A-N or phenomena can also include the voltage, current or temperature associated with the battery modules 122A-N, as excessively high voltage, low voltage, high current, or temperature can be evidence of an impending or occurring thermal runaway event.

The sensor 104 is connected to a detection system 105, and feeds the sensed parameters 239A-N or phenomena data into the detection system 105. The detection system 105, using additional data, determines whether a thermal runaway event is impending or occurring, and then based on that determination can place the ventilation panels 102A-B into active element mode 291 or passive deflagration panel mode 293.

The ventilation panels 102A-B are hinged, and each are connected to an actuator 103A-B. The actuators 103A-B are controlled by the detection system 105. If the detection system 105 detects smoke or carbon monoxide (CO), a thermal runaway event is occurring or imminent, and the detection system 105 will open the actuators 103A-B using power from the universal power system (UPS) 107 onboard the battery node 110A. Doing so places the ventilation panels 102A-B into active element mode 291. The actuators 103A-B can lock in place when power from the UPS 107 is removed, allowing the actuators 103A-B and consequently the ventilation panels 102A-B to stay open for the duration of the thermal runaway event, even if power to or from the UPS 107 is lost. Upon conclusion of the thermal runaway event, the ventilation panels 102A-B can be manually closed. In some examples, if power is not lost to or from the UPS 107, the detection system 105 may be configured or instructed to close the ventilation panels 102A-B.

Figure 1B:
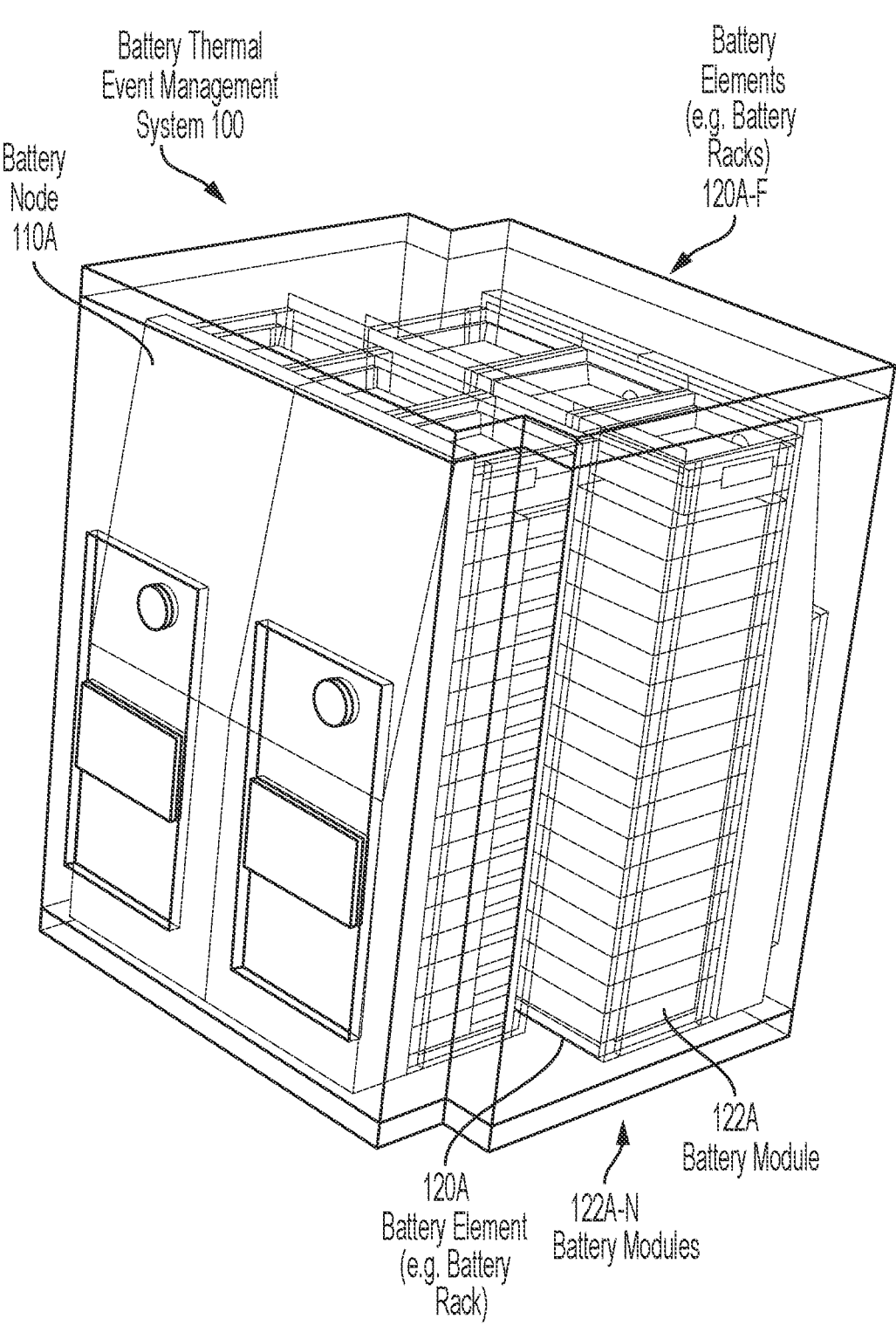
FIG. 1B is an isometric translucent view of the battery node of FIG. 1A that includes multiple battery elements of multiple battery modules.

FIG. 1B is an isometric view of a battery node 110A that includes multiple battery elements 120A-F of multiple battery modules 122A-N. The battery node 110A stores a plurality of battery elements 120A-F. The battery node 110A is both a physical collection of battery elements 120A-F, as well as a logical and electrical collection of battery elements 120A-F: the battery node 110A physically houses the battery elements 120A-F, and the electrical performance of the battery elements 120A-F within the battery node 110A may be attributed to the battery node 110A itself. For example, if a battery element 120A is able to store one hundred and two kilowatt hours of energy, and the battery node 110A contains six battery elements 120A-F, then the battery node 110A may be understood to and be described as storing six hundred and twelve kilowatt hours of energy. A battery node 110A may contain greater or fewer numbers of battery elements 120A than depicted in the figure.

A given battery element 120A contains multiple battery modules 122A-N. Much like the relationship between a battery node 110A and contained battery elements 120A-F, the battery element 120A is both a physical collection of battery modules 122A-N as well as a logical and electrical collection of battery modules 122A-N. As an example, if a battery module 122A is able to store six kilowatt hours of energy, and the battery element 120A contains seventeen battery modules 122A-N, then the battery element 120A may be understood to and be described as storing one hundred and two kilowatt hours of energy. A battery element 120A may contain greater or fewer numbers of battery modules 122A than depicted in the figures.

As the battery element 120A is a logical and electrical collection of battery modules 122A-N, the collection is not defined by the physical structure or ordering of the battery modules 122A-N. Therefore, the battery element 120A may be alternatively described as a battery rack, a battery sub-rack, or a battery array: each of these terms (element, rack, sub-rack, array) are categories of battery element 120A: a battery element 120A is the logical and electrical collection of battery modules 122A-N, without explicit regard for physical structure or ordering of the battery modules 122A-N. In some implementations, a finer level of encapsulation exists within the battery module 122A, which may be identified as a battery cell within the battery module 122A, comprising prismatic, pouch, or cylindrical battery cells.

The battery node 110A represents a single physical fixture, which may be limited in maximum size by the mass or volume a person, forklift, or vehicle is capable of transporting as a singular, atomic unit. The battery element 120A or battery module 122A within the battery node 110A represents an organizational structure for organizing and stacking battery cells within the battery node 110A. A battery cell is generally the largest unit of manufacture a battery producer can produce capable of charging and discharging electricity at a chemical level. Battery cells are grouped into battery module 122A, which represents the smallest unit a particular operator would remove or replace in the energy storage system 100: in examples where a single battery module 122A includes multiple battery cells, the individual battery cells are too small or sensitive to perform on-site particularized maintenance, and instead the entire battery module 122A is either collectively repaired or replaced.

Figure 1C:
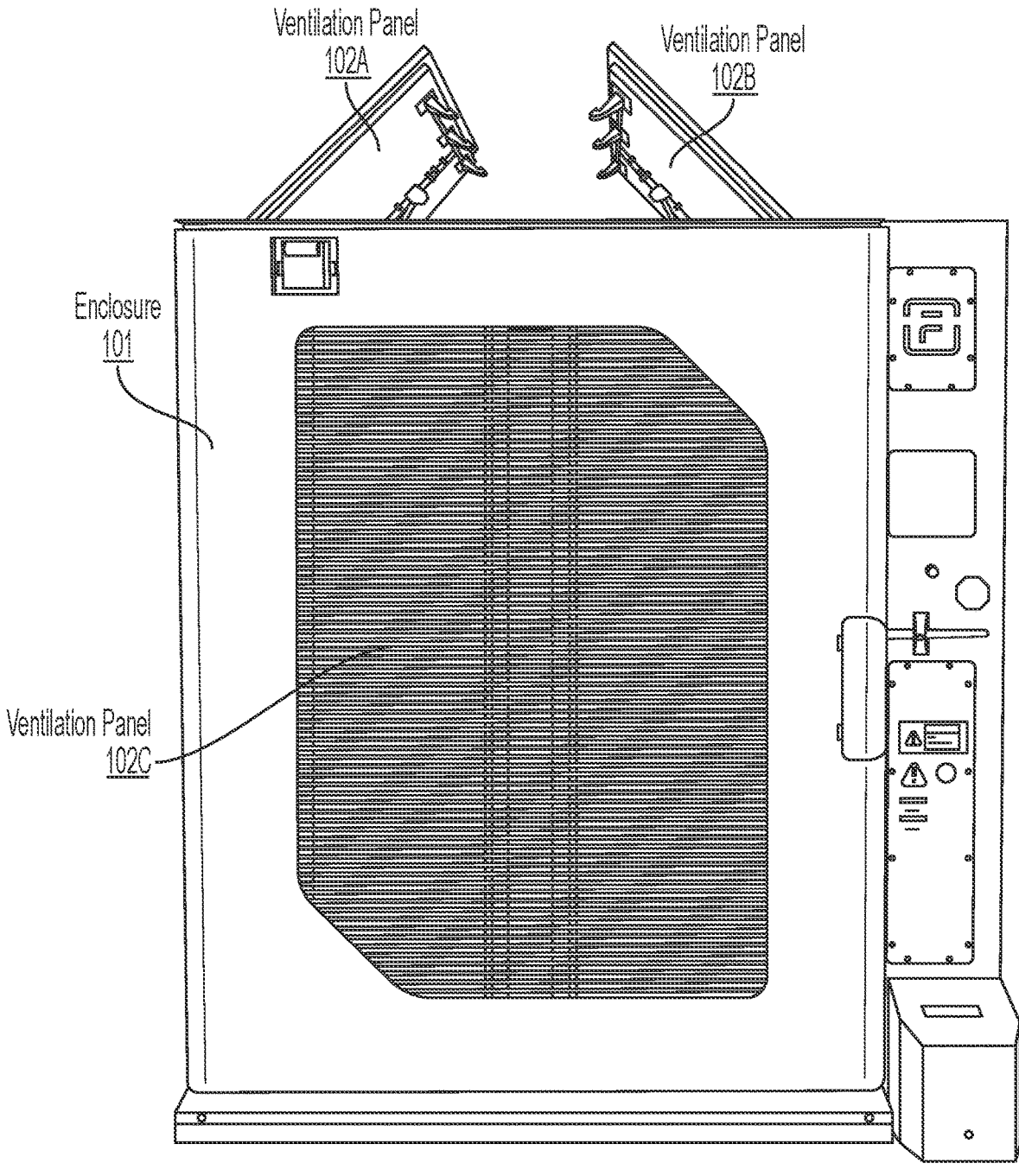
FIG. 1C is a front view of the battery node of FIG. 1A with the two ventilation panels in an active element mode.

FIG. 1C is a front view of the battery node of FIG. 1A with the two ventilation panels 102A-B in active element mode 291. The ventilation panels 102A-B are open, and any gas or smoke within the enclosure 101 is capable of rapid evacuation. Additionally, the front ventilation panel 102C is shown, which is a louvred side panel functioning as both a passive vent and a door.

Figure 2:
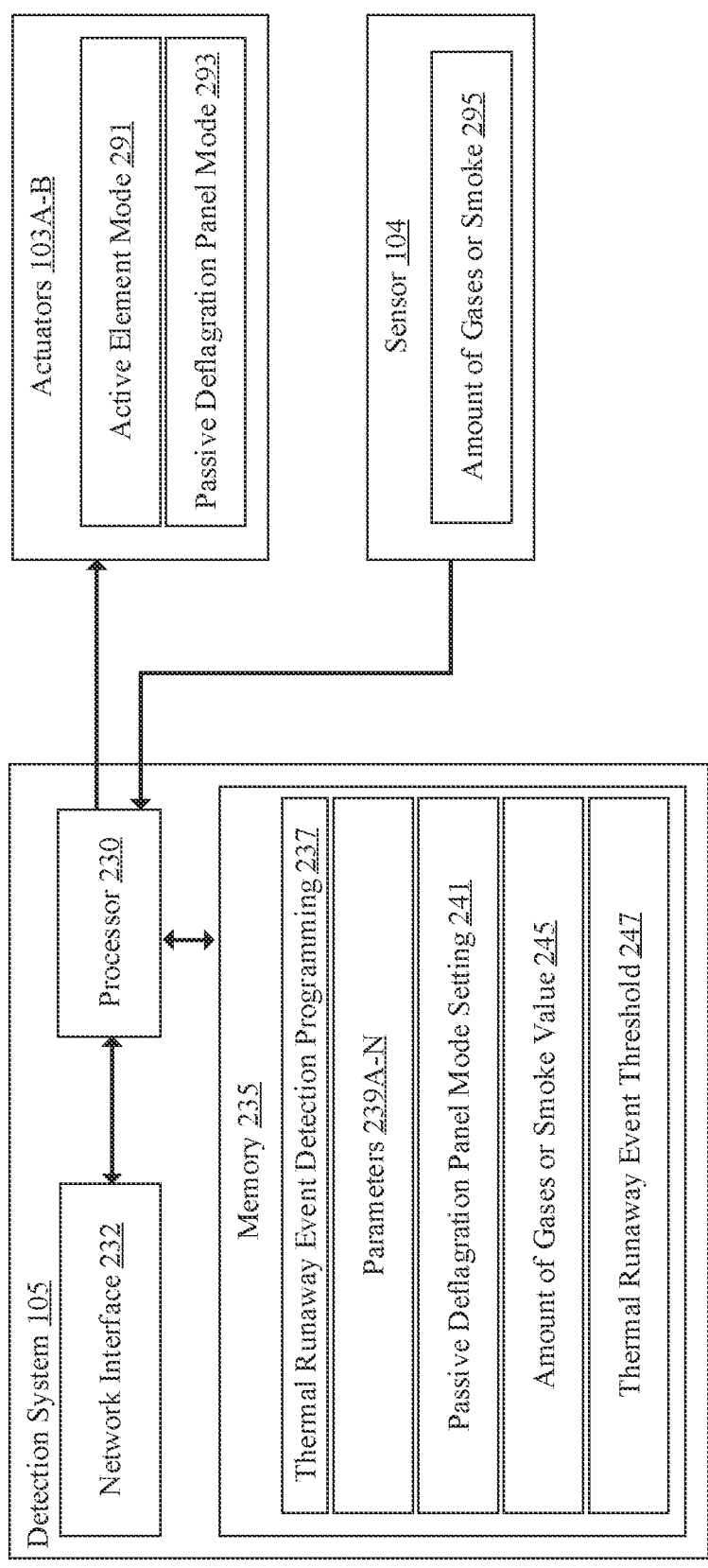
FIG. 2 is a diagram of a detection system of the battery thermal event management system.

FIG. 2 is a diagram of the detection system 105 of the battery thermal event management system 100. The detection system 105 collects parameter 239A-N data regarding all of the battery modules 122A-N in the battery thermal event management system 100. The parameters 239A-N can include: a singular temperature of the entire battery thermal event management system 100, multiple temperatures from different positions in the battery thermal event management system 100, or individual temperatures of some or all of the battery modules 122A-N; a singular gas pressure; particulate parts per million (ppm) indicating smoke; the overall voltage of the battery node 110A, or individual voltages of some or all battery modules 122A-N. The parameters 239A-N can also include related measurements from outside the enclosure 101, such as the temperature or ambient air pressure, to facilitate comparison and prevent a false positive in determining a thermal runaway event.

The detection system 105 includes a processor 230. The processor 230 serves to perform various operations, for example, in accordance with instructions or programming executable by the processor 230. For example, such operations may include operations related to communications with various battery thermal event management system 100 elements, such as actuators 103A-B or sensor 104. Although the processor 230 may be configured by use of hardwired logic, typical processors are general processing circuits configured by execution of programming. The processor 230 includes elements structured and arranged to perform one or more processing functions, typically various data processing functions. Although discrete logic components could be used, the examples utilize components forming a programmable CPU. The processor 230 for example includes one or more integrated circuit (IC) chips incorporating the electronic elements to perform the functions of the CPU. The processor 230 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware. Although the illustrated examples of the processor 230 include only one microprocessor, for convenience, a multi-processor architecture can also be used. A digital signal processor (DSP) or field-programmable gate array (FPGA) could be suitable replacements for the processor 230 but may consume more power with added complexity.

A memory 235 is coupled to the processor 230. The memory 235 is for storing data and programming. In the example, the memory 235 may include a flash memory (non-volatile or persistent storage) and/or a random-access memory (RAM) (volatile storage). The RAM serves as short term storage for instructions and data being handled by the processor 230 e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The detection system 105 may also include a network interface 232 coupled to the processor 230. The network interface 232 is configured to report thermal runaway event data including parameters 239A-N and the passive deflagration panel mode setting 241 from the battery node 110A to a networked server. Additionally, the network interface 232 can collect performance data from the battery modules 122A-N if the battery modules 122A-N are equipped with a network interface.

The detection system 105 may be implemented in a distributed manner: the processor 230 may be divided in to two or more processors, along with two or more memory devices 235. The processors 230 may work in parallel, and may also specialize and perform particular tasks. The memory 235 devices may store a full copy of all thermal runaway event data, or may specialize and store particular data relevant to a particular processor 230. In an example, the detection system 105 is divided into a local and remote grouping. A local processor 230, local memory 235, and local network interface 232 can collect thermal runaway event data from the sensor 104; while a remote processor 230, remote memory 235, and remote network interface 232 can receive the collected data and perform analysis and decision-making.

To facilitate the process of detecting and terminating a thermal runaway event, the memory 235 includes several objects. In particular, the thermal runaway event programming 237 is the programming which implements the thermal runaway event detection protocol 500.

A parameter 239A-N, as described earlier, is any quantification of a physical phenomena that can aid in determining whether a thermal runaway event is impending or occurring. The parameters 239A-N can include: a singular temperature of the entire battery thermal event management system 100, multiple temperatures from different positions in the battery thermal event management system 100, or individual temperatures of some or all of the battery modules 122A-N; a singular gas pressure; particulate parts per million per volume (ppmv) indicating smoke; the overall voltage of the battery node 110A, or individual voltages of some or all battery modules 122A-N. The parameters 239A-N can also include related measurements from outside the enclosure 101, such as the temperature or ambient air pressure, to facilitate comparison and prevent a false positive in determining a thermal runaway event.

The passive deflagration panel mode setting 241 tracks whether the ventilation panels 102A-B are presently in passive deflagration panel mode 293 and closed, or whether they are not in passive deflagration panel mode 293 or open. In this embodiment, sensors can be included to verify that the ventilation panels 102A-B are closed, without including sensors to verify the ventilation panels 102A-B are partially or fully open. However, sensors to determine whether the ventilation panels 102A-B are partially or fully open are contemplated. As passive deflagration panel mode 293 in concert with the closed state of the ventilation panels 102A-B is tracked, the detection system 105 does not need to track active element mode 291 or whether the ventilation panels 102A-B are in an open state: Either the detection system 105 presumes that, when the passive deflagration panel mode setting 241 is not set closed, the ventilation panels 102A-B are not assumed to be closed, or the detection system 105 makes no assumptions about the open-ness of the ventilation panels 102A-B when the passive deflagration panel mode setting is not set to closed, as the ventilation panels 102A-B may be blocked or damaged, and therefore cannot be attested to or relied upon by the detection system 105. A network interface 232 reporting the passive deflagration panel mode setting 241 to a networked server also facilitates identification, inspection, and resetting the battery thermal event management system 100 after a thermal runaway event, in particular in implementations where the actuators 103A-B must be manually closed. The network interface 232 of a battery node 110A can notify nearby battery nodes 110A-N (see FIG. 4) to either enter active element mode 291 or prevent entry into active element mode 291 during a thermal runaway event within battery node 110A. In some examples, once a given battery node 110A has begun a thermal runaway event, the primary concern is of evacuating operators of the energy storage system 400 (see FIG. 4). Once a battery node 110A begins venting, the vented particulate matter could rise and then fall into nearby venting battery nodes 110B-N, potentially igniting those battery nodes 110B-N. By preventing nearby battery nodes 110B-N from venting, the overall risk of ignition can be reduced. Alternatively, venting adjacent battery nodes 110B-N can pre-emptively lower the differential pressure of the adjacent battery nodes 110B-N, or allow for fire retardant to be sprayed effectively across and into the battery nodes 110A-N, reducing overall fire risk.

The amount of gases or smoke value 245 is a quantified version of the amount of gases or smoke 295 detected by the sensor 104. Quantifying the amount of gases or smoke 295 into an amount of gases or smoke value 245 in the memory 235 facilitates comparison to the thermal runaway event threshold 247 in the memory 235. Once the amount of gases or smoke 295 is in excess of the thermal runaway event threshold 247, a thermal runaway event is determined to be impending or occurring, and the thermal runaway event detection programming 237 directs the actuators 103A-B to place the ventilation panels 102A-B into active element mode 291.

Figure 3:
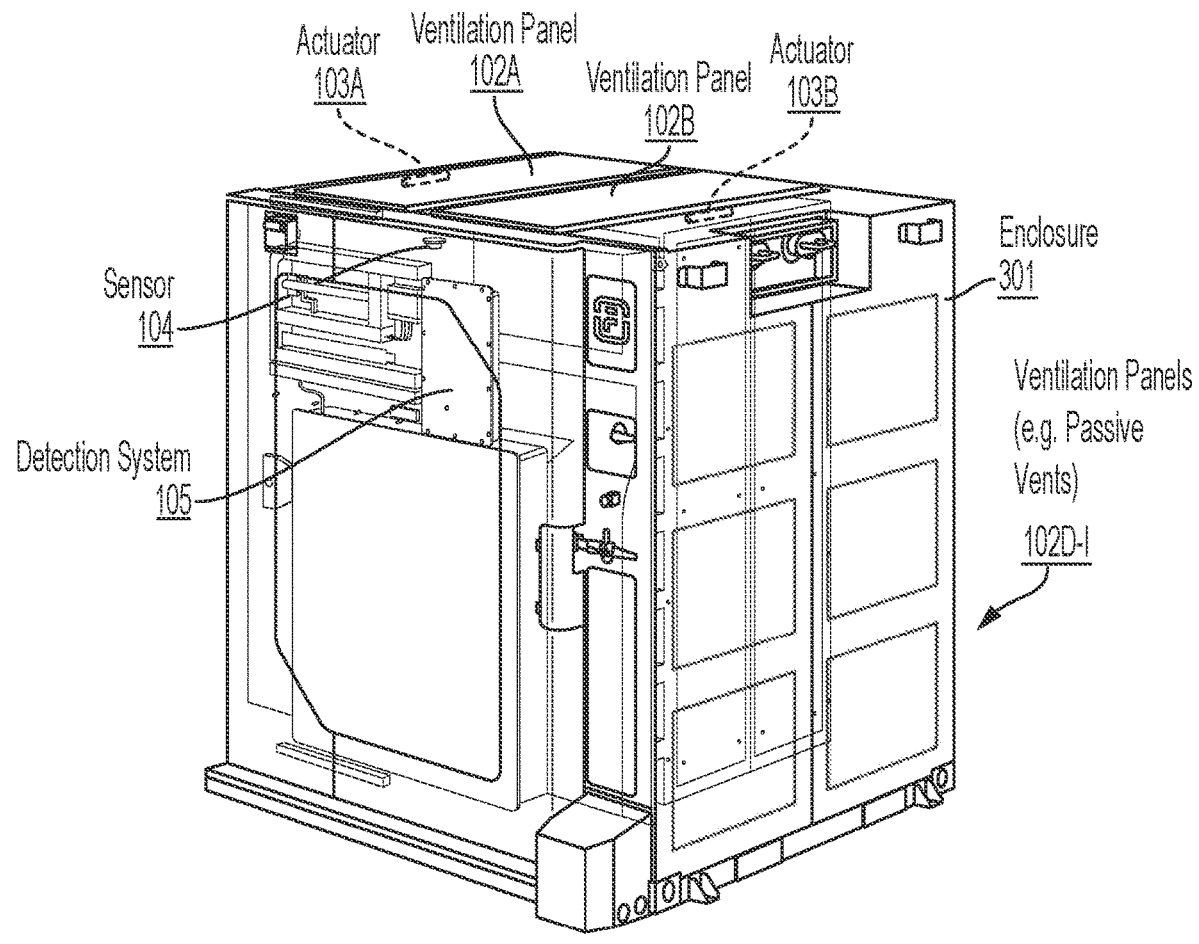
FIG. 3 is an isometric translucent view of a battery thermal event management system implemented in a battery node with two ventilation panels on the top of the battery node enclosure, and six passive vents formed on the side of the enclosure.

FIG. 3 is an isometric translucent view of a battery thermal event management system 300 implemented in a battery node 110B with two ventilation panels 102A-B on the top of the battery node enclosure, and six passive vents or ventilation panels 102D-I formed on the side of the enclosure 301. The passive vents or ventilation panels 102D-I function similarly to ventilation panel 102C from FIG. 1C, or like ventilation panels 102A-B in passive deflagration panel mode 293. The ventilation panels 102C-I, rather than pivoting about a hinge when gas pressure within the enclosure is in excess of reasonable values, may instead be a louvered vent or interface, allowing gas to freely exchange between the atmosphere and the interior of the enclosure 301. However, ventilation panels 102D-I may also be hinged, and pivot about the hinge during excessive gasp pressure: the hinge may connect at the top of the ventilation panels 102D-I or the sides of the ventilation panels 102D-I.

The ventilation panels 102D-I, along with the structure and interior features of the enclosure 101, may resemble the features presented in the energy storage system described in International Application No. PCT/US2021/30551, filed on May 4, 2021, titled "Energy Storage System with Removable, Adjustable, and Lightweight Plenums," the entirety of which is incorporated by reference herein.

Therefore FIGS. 1-3 depict a battery thermal event management system 100 including an enclosure 101 to store a plurality of battery modules 122A-N, and a plurality of ventilation panels 102A-B that are operable in both an active element mode 291 and a passive deflagration mode 293. The battery thermal event management system 100 also includes at least one actuator 103A-B to open the ventilation panels 102A-B, and at least one sensor 104 to detect one or more parameters 239A-N that are indicia of a thermal runaway event. Further, the battery thermal event management system 100 includes a detection system 105 coupled to the enclosure 101. The detection system 105 includes a processor 230 coupled to the at least one actuator 103A-B and the at least one sensor 104 and a memory 235 accessible to the processor 230. The memory 235 comprises thermal runaway event detection programming 237, which when executed configures the battery thermal event management system 100 to implement the following functions. First, the battery thermal event management system 100 detects, via the at least one sensor 104, the one or more parameters 239A-N that are indicia of the thermal runaway event. Second, the battery thermal event management system 100 determines whether the detected one or more parameters 239A-N indicate the thermal runaway event. Third, based on the detected one or more parameters 239A-N indicate the thermal runaway event, the battery thermal event management system 100 opens, via the at least one actuator 103A-B, the ventilation panels 102A-B to allow one or more gases or smoke to escape from inside the enclosure 101 and thereby operate the ventilation panels 102A-B in the active element mode 291.

In some examples of the battery thermal event management system 100, prior to being opened via the at least one actuator 103A-B, the ventilation panels 102A-B are closed to thereby operate the ventilation panels 102A-B in the passive deflagration panel mode 293. The battery thermal event management system 100 is designed to maintain a sufficiently low volume of gas in the battery node 110A enclosure 101 resulting from thermal runaway to prevent the battery node 110A from becoming over-pressurized. When closed, the ventilation panels 102A-B act as deflagration panels (i.e., pressure alone will open ventilation panels 102A-B). When open the ventilation panels 102A-B allow battery cell 122A gas to escape to the atmosphere rather than accumulating within the enclosure 101, limiting the combustible volume of gas.

The battery thermal event management system 100 can consists of two hinged panels 102A-B on the top of the battery node 110A, each containing a single actuator 103A-B. If a fire alarm system or sensor 104 detects smoke or CO, the battery thermal event management system 100 will open the actuators 103A-B using power from the universal power system (UPS) 107 onboard each battery node 110A. The actuators 103A-B lock in place when power is removed, allowing them to stay open for the duration of the event even if power is lost. Upon conclusion of an event, the ventilation panels 102A-B can be manually closed at a fire control panel.

The one or more parameters 293A-N can include the one or more gases or smoke, or a voltage or a temperature associated with the battery modules 122A-N.

Additionally, the detecting via the at least one sensor 104, the one or more parameters can include detecting an amount of the one more gases or smoke 295 inside the enclosure 101. The determining whether the detected one or more parameters 239A-N indicate the thermal runaway event can include determining whether the detected amount of the one more gases or smoke 295 exceeds a thermal runaway event threshold 247. The opening via the at least one actuator 103A-B, can be based on the detected amount of the one or more gases or smoke 295 exceeding the thermal runaway event threshold 247. The thermal runaway event threshold 247 can include information relating to at least one of a predetermined temperature, a predetermined over-voltage, a predetermined under-voltage, and a predetermined over-current.

Further, the enclosure 101 can include at least one door that is configured to operate as one of the ventilation panels 102C. The at least one actuator 103A-B can be configured to include a spring-loaded mechanism, or to include a motorized mechanism.

In some embodiments, the ventilation panels 102A-I include first ventilation panels 102A-B that are formed at a top of the enclosure 301, and second ventilation panels 102C-I that are formed at sides of the enclosure 101. The first ventilation panels 102A-B can include two hinged panels 102A-B on the top of the enclosure, and the second ventilation panels 102C-I can include four hinged panels like ventilation panels 102A-B at the sides of the enclosure 101. The first ventilation panels 102A-B can include at least one panel 102A actuated by a linear actuator, and the second ventilation panels 102C-I can include at least one ventilation panel 102C that is a spring-loaded side panel. The second ventilation panels 102C-I can also include at least one ventilation panel 102C that is a louvre side panel. In other embodiments, the ventilation panels 102A-B,D-I include six passive vents 102D-I formed on each side of the enclosure 301, and two passive vents 102A-B formed on the top of the enclosure 301. The two passive vents 102A-B on enclosure 301 are structurally the same as the ventilation panels 102A-B on enclosure 101, excepting that the two passive vents 102A-B on enclosure 301 are not controlled by actuators 103A-B as the ventilation panels 102A-B on enclosure 101 are controlled.

The ventilation panels 102A-I can operate as deflagration panels (as if in passive deflagration panel mode 293) when any of the ventilation panels 102A-N are closed or partially opened at a differential pressure (PSID) of between 0.1 and 2.0, and preferably between 0.3 and 0.7, higher inside the enclosure 101 than the ambient atmosphere pressure outside the enclosure 101. The ventilation panels 102A-B can be fully opened to mitigate an explosion risk from the thermal runaway event of one of the battery modules 122A-N by opening into active element mode 291 when sufficient quantities of CO2 or smoke are detected. CO2 can be detected as parts per million by volume (ppmv) in the atmosphere within the enclosure 101 by a sensor 104 configured with an air quality tester, while smoke density can be determined using a sensor 104 configured with a laser. Once the ventilation panels 102A-B are fully open, the ventilation panels 102A-B can be pre-configured to lock in place when the power is removed, staying open for a duration of the thermal runaway event. Upon conclusion of the thermal runaway event, the opened ventilation panels 102A-B can be manually closed, or when the detection system 105 detect conclusion of the thermal runaway event, the detection system 105 could be configured to close the opened ventilation panels 102A-B.

Additionally, if the detection system 105 detects a concentration of the one or more gases or smoke reaches a predetermined level, the predetermined level stored within the thermal runaway event threshold 247, the detection system 105 can control the at least one actuator 103A-B to open the ventilation panels 102A-B to prevent the one or more gases or smoke from building up in the enclosure 101.

Further, the ventilation panels 102A-B can be configured to open simultaneously by a gas pressure generated by the one or more gases or smoke inside the enclosure 101, reaches a predetermined level, the predetermined level stored within the thermal runaway event threshold 247, thereby allowing the one or more gases or smoke to escape outside the enclosure 101.

Still further, the at least one actuator 103A-B can use power from a universal power system (UPS) 107 attached to the enclosure 101. The at least one actuator 103A-B can lock in place when the power is removed, allowing a corresponding panel 102A-B to stay open for a duration of the thermal runaway event even if the power is lost. Upon conclusion of the thermal runaway event, the opened ventilation panels 102A-B can be manually closed, or when the detection system 105 detect conclusion of the thermal runaway event, the detection system 105 closes the opened ventilation panels 102A-B.

FIGS. 1-3 also depict a battery thermal event management system 100 including an enclosure 101 to store a plurality of battery modules 122A-N, and one or more ventilation panels 102A-B. The battery thermal event management system also includes at least one actuator 103A-B to open the one or more ventilation panels 102A-B, and at least one sensor 104 to detect one or more parameters 239A-N. Further, the battery thermal event management system 100 includes a detection system 105 coupled to the enclosure 101. The detection system 105 includes a processor 230 coupled to the at least one actuator 103A-B and the at least one sensor 104 and a memory 235. The memory 235 is accessible to the processor 230 and programmed to configure the battery thermal event management system 100. First, the battery thermal event management system 100 detects, via the at least one sensor 104, the one or more parameters 239A-N. Second, the battery thermal event management system 100 determines whether the detected one or more parameters 239A-N indicate a ventilating event. Third, based on the detected one or more parameters 239A-N indicating the ventilating event, the battery thermal event management system 100 opens, via the at least one actuator 103A-B, the one or more ventilation panels 102A-B.

In some examples of the battery thermal event management system 100, a respective ventilation panel 102A of the one or more ventilation panels 102A-B is operable in a passive deflagration panel mode 293. Prior to being opened, via the at least one actuator 103A, the respective ventilation panel 102A can be closed to thereby operate the respective ventilation panel 102A in the passive deflagration panel mode 293. In other examples of the battery thermal event management system 100, a respective ventilation panel 102A of the one or more ventilation panels 102A-B functions as a passive deflagration panel when not operated in an active element mode 291.

In some examples of the battery thermal event management system 100, a respective ventilation panel 102A of the one or more ventilation panels 102A-B is operable in an in an active element mode 291. Opening, via the at least one actuator 103A, the respective ventilation panel 102A to allow one or more gases or smoke 295 to escape from inside the enclosure 101 thereby operates the respective ventilation panel 102A in the active element mode 291. In some examples the respective ventilation panel 102A can be operated in both the active element mode 291 and the passive deflagration mode 293.

The one or more parameters 239A-N can be parameters indicia of a thermal runaway event.

Additionally, in some examples, the memory 235 includes thermal runaway event detection programming 237, and execution of the thermal runaway event detection programming by the processor 230 configures the battery thermal event management system 100 to implement functions. First, the battery thermal event management system 100 detects, via the at least one sensor 104, the one or more parameters 239A-N. Second, the battery thermal event management system 100 determines whether the detected one or more parameters 239A-N indicate a ventilating event. Third, based on the detected one or more parameters 239A-N indicating the ventilating event, the battery thermal event management system 100 opens, via the at least one actuator 103A-B, the one or more ventilation panels 102A-B.

FIG. 4 is an isometric view of an energy storage system 400. The energy storage system 100 includes multiple battery nodes 110A-N with detection system 105. The battery nodes 110A-N include batteries of any existing or future reusable battery technology including lithium ion or flow batteries. The battery nodes 110A-N, collectively and individually, are capable of providing direct current electricity to an external load, and thereby discharging, as well as are capable of receiving direct current electricity from an external source, and thereby charging. The detection systems 105 may operate completely independently, in a fully centralized manner, or in some combination of independent and centralized operation.

To facilitate providing and receiving direct current, the battery nodes 110A-N are connected to one or more power inverters 404. The power inverter 404 is configured to standardize power inputs and outputs to and from the battery nodes 110A-N. As the battery nodes 110A-N provide direct current, the power inverter 404 either transforms direct current into alternating current for use by a connected load 406, normalizes the direct current from the battery nodes 110A-N to the connected load 406, or simply passes the direct current from the battery nodes 110A-N to the connected load. Additionally, as the battery nodes require direct current, the power inverter either transforms alternating current into direct current from an energy source 402, normalizes the direct current from the energy source 402 to the battery nodes 110A-N, or simply passes the direct current from the energy source 402 to the battery nodes 110A-N.

The power inverter is depicted with separate lines to the energy source 402, and the connected load 406: separate lines may be advantageous in scenarios where the energy source 402 is inconsistent, such as a wind or solar-based energy source 402. In such scenarios, the power from the energy source 402 is pushed to the battery nodes 110A-N via a uni-directional power inverter 404, which then either charge or discharge, and provide consistent energy to the connected load 406 via another uni-directional power inverter 404. However, the connected load 406 and the energy source 402 can be connected on the same line to the power inverter 104 via a bi-directional power inverter 404: in scenarios where the energy source 402 is complex and connected to the connected load 406, such as a power grid with consumption devices, a single connection to the energy storage system can either absorb energy produced by the energy source 102 in excess of the demand of the connected load 406, or provide energy to the connected load 406 in excess of the capacity of the energy source 402.

The power inverter 404 may include a power converter as well, to facilitate normalizing input or output wattage or voltage, in order to provide consistent output and protect the battery nodes 110A-N, energy source 402, or connected load 406 from damage.

The energy source 402 can be any suitable system for producing electrical energy, such as a turbine or photovoltaic cell. The connected load 406 can include a power grid or a smaller local load such as a backup power system for a facility such as a hospital, manufacturing site, residential home, or other suitable facility.

Generally, the battery nodes 110A-N of the energy storage system 400 connected to an inverter 404 or group of inverters 404 operate in concert: either providing power to a connected load 406 and discharging, or receiving power from an energy source 402 and charging. Further methods and systems related to the management and maintenance of the battery nodes 110A-N of the energy system 400 are disclosed in U.S. application Ser. No. 17/810,983, filed on Jul. 6, 2022, titled "Cell and Rack Performance Monitoring System and Method," the entirety of which is incorporated by reference herein.

FIG. 5 is a flowchart depicting a thermal runaway event detection protocol 500. The battery thermal event management system 100 implements the thermal runaway event detection protocol 500 to detect and terminate thermal runaway events in a battery node 110A.

In order to detect a thermal runaway event in battery node 110A, in step 505 the thermal runaway event detection protocol 500 detects, via at least one sensor 104, one or more parameters 239A-N that are indicia of a thermal runaway event. In step 510, the thermal runaway event detection protocol 500 determines whether the detected one or more parameters 39A-N indicate the thermal runaway event. In step 515, upon determining that the thermal runaway event is occurring, the thermal runaway event detection protocol 500 opens, via at least one actuator 103A-B, a plurality of ventilation panels 102A-B to allow one or more gases or smoke to escape from inside an enclosure 101, the enclosure 101 storing a plurality of battery modules 122A-N.

Therefore, FIG. 5 depicts a method including first detecting, via at least one sensor 104, one or more parameters 239A-N that are indicia of a thermal runaway event. Second, the method includes determining whether the detected one or more parameters 239A-N indicate the thermal runaway event. Third, based on the detected one or more parameters indicating the thermal runaway event, the method includes opening, via at least one actuator 103A-B, a plurality of ventilation panels 102A-B to allow one or more gases or smoke to escape from inside an enclosure 101 to store a plurality of battery modules 122A-N and thereby operate the ventilation panels in an active element mode 291.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A battery thermal event management system, comprising:
   an enclosure to store a plurality of battery modules;
   one or more ventilation panels;
   at least one actuator to open the one or more ventilation panels;
   at least one sensor to detect one or more parameters; and
   a detection system coupled to the enclosure and including:
      a processor coupled to the at least one actuator and the at least one sensor;
      a memory accessible to the processor and programmed to configure the battery thermal event management system to:
         detect, via the at least one sensor, the one or more parameters;
         determine whether the detected one or more parameters indicate a ventilating event; and
         based on the detected one or more parameters indicating the ventilating event, open, via the at least one actuator, the one or more ventilation panels, wherein the at least one actuator uses power from a power source and wherein the at least one actuator locks in place when the power from the power source is removed, allowing a corresponding panel to stay open for a duration of the ventilating event even if the power is lost.

2. The battery thermal event management system of claim 1, wherein a respective ventilation panel of the one or more ventilation panels is operable in a passive deflagration panel mode.

3. The battery thermal event management system of claim 2, wherein prior to being opened, via the at least one actuator, the respective ventilation panel is closed to thereby operate the respective ventilation panel in the passive deflagration panel mode.

4. The battery thermal event management system of claim 1, wherein a respective ventilation panel of the one or more ventilation panels is operable in an active element mode.

5. The battery thermal event management system of claim 4, wherein opening, via the at least one actuator, the respective ventilation panel to allow one or more gases or smoke to escape from inside the enclosure thereby operates the respective ventilation panel in the active element mode.

6. The battery thermal event management system of claim 4, wherein the respective ventilation panel is operable in a passive deflagration panel mode.

7. The battery thermal event management system of claim 1, wherein the one or more parameters are parameters indicia of a thermal runaway event.

8. The battery thermal event management system of claim 7, wherein the one or more parameters include the one or more gases or smoke.

9. The battery thermal event management system of claim 7, wherein the one or more parameters include a voltage or a temperature associated with the battery modules.

10. The battery thermal event management system of claim 1, wherein:
   the memory includes thermal runaway event detection programming; and
   execution of the thermal runaway event detection programming configures the battery thermal event management system to:
      detect, via the at least one sensor, the one or more parameters;
      determine whether the detected one or more parameters indicate a thermal runaway event; and
      based on the detected one or more parameters indicating the thermal runaway event, open, via the at least one actuator, the one or more ventilation panels.

11. The battery thermal event management system of claim 10, wherein:
   the detecting, via the at least one sensor, the one or more parameters includes detecting an amount of the one more gases or smoke inside the enclosure;
   the determining whether the detected one or more parameters indicate the thermal runaway event includes determining whether the detected amount of the one more gases or smoke exceeds a thermal runaway event threshold; and
   the opening, via the at least one actuator, is based on the detected amount of the one or more gases or smoke exceeding the thermal runaway event threshold.

12. The battery thermal event management system of claim 1, wherein the enclosure includes at least one door that is configured to operate as one of the ventilation panels.

13. The battery thermal event management system of claim 1, wherein the at least one actuator is configured to include a spring-loaded mechanism.

14. The battery thermal event management system of claim 1, wherein the at least one actuator is configured to include a motorized mechanism.

15. The battery thermal event management system of claim 1, wherein the ventilation panels include first ventilation panels that are formed at a top of the enclosure, and second ventilation panels that are formed at sides of the enclosure.

16. The battery thermal event management system of claim 11, wherein the thermal runaway event threshold includes information relating to at least one of a predetermined temperature, a predetermined over-voltage, a predetermined under-voltage, and a predetermined over-current.

17. The battery thermal event management system of claim 10, wherein the ventilation panels operate as deflagration panels when all of them are closed or partially opened, and are fully opened to mitigate an explosion risk from the thermal runaway event of one of the battery modules by opening at a differential pressure (PSID) of between 0.1 and 2.0.

18. The battery thermal event management system of claim 1, wherein if the detection system detects a concentration of the one more gases or smoke reaches a predetermined level, the detecting system controls the at least one actuator to open the ventilation panels to prevent the one more gases or smoke from building up in the enclosure.

19. The battery thermal event management system of claim 1, wherein the ventilation panels are configured to open simultaneously by a gas pressure generated by the one more gases or smoke inside the enclosure when the gas pressure reaches a predetermined level, thereby allowing the one more gases or smoke to escape outside the enclosure.

20. The battery thermal event management system of claim 1, wherein the power source comprises a universal power system attached to the enclosure.

21. The battery thermal event management system of claim 1, wherein upon conclusion of the ventilating event, the opened ventilation panels are manually closed.

22. The battery thermal event management system of claim 1, wherein the detection system detects conclusion of the ventilating event, the detection system closes the opened ventilation panels.

23. A method, comprising:

detecting, via at least one sensor, one or more parameters that are indicia of a thermal runaway event;

determining whether the detected one or more parameters indicate the thermal runaway event;

based on the detected one or more parameters indicating the thermal runaway event, opening, via at least one actuator, a plurality of ventilation panels to allow one or more gases or smoke to escape from inside an enclosure to store a plurality of battery modules and thereby operate the ventilation panels in an active element mode; and locking the at least one actuator in place when a power supplied to the at least one actuator is removed, allowing at least one corresponding panel to stay open for a duration of the thermal runaway event if the power supplied to the at least one actuator is lost.

24. A non-transitory machine-readable medium, comprising:

thermal runaway event detection programming, wherein execution of the thermal runaway event detection programming configures a battery thermal event management system to:

detect, via an at least one sensor, one or more parameters that are indicia of a thermal runaway event;

determine whether the detected one or more parameters indicate the thermal runaway event;

based on the detected one or more parameters indicating the thermal runaway event, open, via at least one actuator, a plurality of ventilation panels to allow one or more gases or smoke to escape from inside an enclosure to store a plurality of battery modules and thereby operate the ventilation panels in an active element mode; and locking the at least one actuator in place when a power supplied to the at least one actuator is removed, allowing at least one corresponding panel to stay open for a duration of the thermal runaway event if the power supplied to the at least one actuator is lost.

* * * * *